United States Patent [19]
Hanisko et al.

[11] Patent Number: 4,672,225
[45] Date of Patent: Jun. 9, 1987

[54] AUTOMOTIVE ANTI-THEFT DEVICE

[76] Inventors: John C. P. Hanisko, 21888 Murray Crescent, Southfield, Mich. 48076; Victor J. Borowski, 22362 Morley, Dearborn, Mich. 48124

[21] Appl. No.: 817,467

[22] Filed: Jan. 9, 1986

[51] Int. Cl.[4] .................. H02J 13/00; B60R 25/04
[52] U.S. Cl. ..................... 307/10 AT; 361/172; 180/287
[58] Field of Search .............. 307/10 AT; 317/134; 340/64; 70/255; 180/287; 361/172

[56] References Cited
U.S. PATENT DOCUMENTS

| | | | |
|---|---|---|---|
| 3,438,771 | 4/1969 | Commins | 180/114 |
| 3,455,403 | 7/1969 | Hawthorne | 180/1 |
| 3,544,804 | 12/1970 | Gaumer et al. | 307/10 |
| 3,628,056 | 12/1971 | Buchanon | 307/10 |
| 3,634,724 | 1/1972 | Vest | 307/10 AT X |
| 3,634,880 | 1/1972 | Hawkins | 340/63 |
| 3,670,836 | 6/1972 | Tonkowich et al. | 307/10 AT X |
| 3,675,035 | 7/1972 | Brasty | 307/10 AT |
| 3,675,036 | 7/1972 | Davies | 307/10 AT |
| 3,718,202 | 2/1973 | Brock | 307/10 X |
| 3,731,156 | 5/1973 | Watson | 317/134 |
| 3,738,444 | 6/1973 | Roby | 307/10 AT X |
| 3,749,930 | 7/1973 | Roe | 307/10 |
| 3,756,341 | 9/1973 | Tonkowich et al. | 307/10 AT |
| 3,783,303 | 1/1974 | Johnson, Jr. | 307/10 AT |
| 3,784,839 | 1/1974 | Weber | 307/10 AT |
| 3,818,436 | 6/1974 | Hong | 307/10 AT X |
| 3,834,484 | 9/1974 | Sangster | 307/10 AT X |
| 3,851,504 | 12/1974 | Theobald | 307/10 AT X |
| 3,876,884 | 4/1975 | Housman et al. | 307/10 AT |
| 3,885,164 | 5/1975 | Vest | 307/10 AT |
| 3,987,408 | 10/1976 | Sassover et al. | 340/64 |
| 4,023,042 | 5/1977 | Archer, Jr. et al. | 307/10 AT |
| 4,063,610 | 12/1977 | Shilling | 307/10 AT X |
| 4,064,547 | 12/1977 | Zagwyn | 307/10 AT X |
| 4,071,007 | 1/1978 | Arix | 307/10 AT X |
| 4,090,089 | 5/1978 | Morello et al. | 307/10 AT X |
| 4,107,543 | 8/1978 | Kapln | 307/10 AT |
| 4,110,734 | 8/1978 | Lepore et al. | 307/10 AT X |
| 4,157,478 | 6/1979 | Quinton | 307/10 AT |
| 4,157,479 | 6/1979 | Chan | 307/10 AT |
| 4,186,710 | 2/1980 | Kilgore | 307/10 AT X |
| 4,207,750 | 6/1980 | Wharton | 307/10 AT X |
| 4,209,709 | 6/1980 | Betton | 307/10 AT |
| 4,278,963 | 7/1981 | Allen | 307/10 AT X |
| 4,292,541 | 9/1981 | Ambrosius | 307/10 AT |
| 4,366,466 | 12/1982 | Lutz | 307/10 AT X |
| 4,371,052 | 2/1983 | Brandt | 307/10 AT X |

Primary Examiner—William M. Shoop, Jr.
Assistant Examiner—Sharon D. Logan
Attorney, Agent, or Firm—Cullen, Sloman, Cantor, Grauer, Scott & Rutherford

[57] ABSTRACT

An anti-theft device for automobile vehicles disables the vehicle's starter ignition system unless a coded resistive element is inserted into the device by the vehicle's operator. A control system senses the value of the coded resistive element and enables the starter system if the sensed value is correct. A latching circuit latches-in enablement of the starter system after an arming switch is activated and the resistive element has been removed, serving to provide a valet function. A lock-out circuit prevents enablement of the starter system for a prescribed time period following an unauthorized attempt at enabling the system, as when an incorrect resistive element is inserted into the device. The device employs a normally closed relay to enable the starter system so that failure of those portions of the device which are most likely to fail does not affect normal operation of the starter system.

21 Claims, 2 Drawing Figures

AUTOMOTIVE ANTI-THEFT DEVICE

TECHNICAL FIELD

The present invention broadly relates to anti-theft systems for automobile vehicles, and deals more particularly with a security device for selectively disabling a vehicle's starter ignition system.

BACKGROUND ART

The art is replete with various types of anti-theft devices for preventing unauthorized use or theft of vehicles. Some of these devices are relatively simple and are calculated to stop or discourage the unskilled thief but are relatively ineffective in deterring the professional thief. More sophisticated anti-theft devices have been proposed which are relatively complex and may employ complex electronic circuits, typically employing a microcomputer. These latter-mentioned devices, however, are relatively expensive in terms of their components and the labor required to assemble them and are subject to reliability problems. Some of these devices impose relatively large idle-current demands on the automotive electrical system and others, in spite of their relative complexity, are not completely effective in deterring the professional thief.

It is generally thought that an anti-theft device which deters the thief for at least five minutes provides an effective anti-theft system. In order to accomplish this objective, the system must be: (1) relatively inaccessible, (2) not readily bypassed or deactivated, and (3) if employing a code, the code must not be readily decipherable either by multiple trial-and-error attempts or by electrical measurements. Moreover, such a device should not interfere with the normal operation of the vehicle.

SUMMARY OF THE INVENTION

According to the present invention, an anti-theft device is provided which is adapted to be connected with a vehicle's starter (ignition) system and employs a coded resistive element having a resistive value unique to the particular device, which functions as a "key" to enable the vehicle's starter system. The resistive element is removably mounted on the vehicle such that the vehicle's operator may remove it from the vehicle and thereby effectively "lock" the vehicle's starter system while unattended. The device includes an arming switch for activating and deactivating the security system. A latching circuit is provided for enabling the starter system after the arming switch is activated and the resistive element is later removed by the operator; in this manner, the vehicle can be started, as by a valet, after the coded resistive element has been removed. A lock-out circuit prevents enablement of the starter system for a preselected time period following an unauthorized attempt at enabling the system, such as when a thief installs a resistive element having an improper resistive value. The proper resistive value is sensed by a window comparator which determines whether the voltage across the resistive element is within a preselected range. The device employs a normally closed relay for closing a set of switch contacts that enable the starter system, which effectively provides a failsafe feature preventing disablement of the starter system in the event of a failure of those components of the device which are most likely to fail.

It is a primary object of the present invention to provide an anti-theft device for an automobile vehicle which is relatively simple in design but yet which is highly effective in deterring unauthorized use of the vehicle.

Another object of the invention is to provide a device as described above which employs a resistive element having a resistive value unique to the device, as a coded key, for enabling the vehicle's starter system and which may be removed from the vehicle by its operator to prevent unauthorized use of the vehicle.

A still further object of the invention is to provide a device as described above which allows use of the vehicle and unlimited restarting of the vehicle, as by a valet, after the vehicle's owner has removed the coded resistive element.

Another object of the invention is to provide a device as described above which is effective in locking out enablement of the starter system when an unauthorized attempt is made to enable the device, as by using an improperly coded resistive element.

A still further object of the invention is to provide a device as described above which does not interfere with normal operation of the vehicle's starter system in the event of a failure of one or more of those components or circuits of the device which are most likely to fail.

These and further features and objects of the invention will be made clear or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical components in the various views.

DESCRIPTION OF THE PREFERRED EMBODIMENTS

Figure 1:
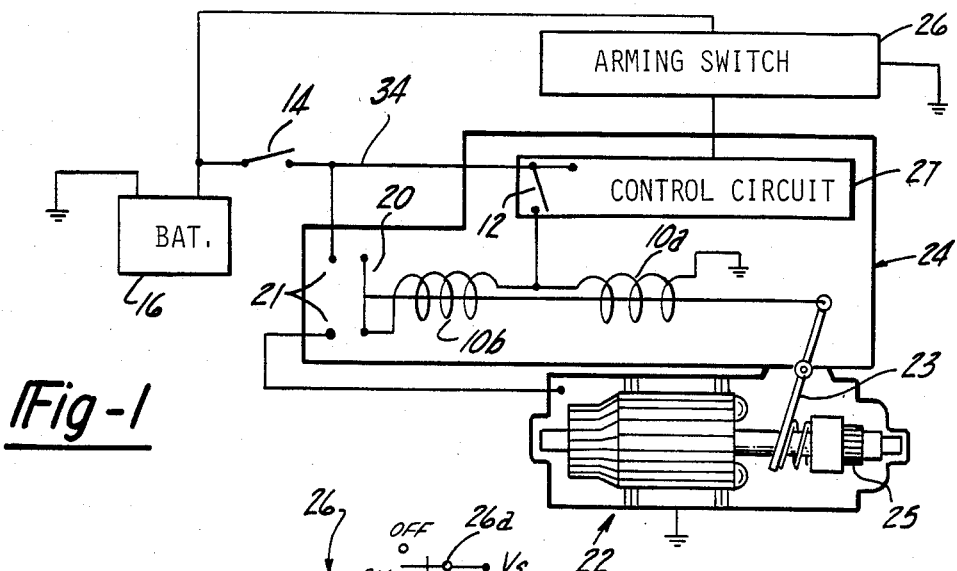
FIG. 1 is a combined broad block and schematic diagram of the automotive anti-theft device which forms the preferred embodiment of the present invention; and, FIG. 2 is a detailed schematic diagram of the arming switch and control circuit shown in FIG. 1.

Referring first to FIG. 1, the present invention is broadly concerned with an anti-theft device for preventing unauthorized use of an electrically controlled device. In the illustrated embodiment, the protected, electrically controlled device is the starter system of a vehicle. However, it is to be understood that the present invention has application to virtually any type of device which relies on an electrical circuit for its operation or use.

The basic components of a vehicle's starter system are depicted in FIG. 1, having the anti-theft device installed therein. A conventional source of direct current power, such as the battery 16, is connected in a series circuit which includes a conventional starter control (ignition) switch 14, a security switch 12, a pull-in winding 10a and a hold-in winding 10b of a solenoid, and the starter motor 22. With the switches 12 and 14 closed, the battery 16 energizes the coil 10a which operates a plunger 20 which engages (via shift lever 23) the starter drive pinion gear 25 with the engine fly wheel ring gear and simultaneously closes a pair of contacts 21, thereby completing a circuit between the battery 16 and starter motor 22. If an attempt is made to bypass the anti-theft device by jumping the switch terminal 21, the starter motor will be activated, but the starter pinion gear 25 will not be engaged with the engine fly wheel ring gear and the engine will not "start".

The security switch 12, as will be discussed later in more detail, is normally closed, and is controlled by a control circuit 27 and an arming switch 26. The arming switch 26 and starter switch 14 are preferably located inside the vehicle so as to be readily accessible by the vehicle's operator, while the control circuit 27 and security switch 12 may be enclosed within the solenoid housing 24 in the vehicle's engine compartment so as to be relatively inaccessible to a would-be thief.

Figure 2:
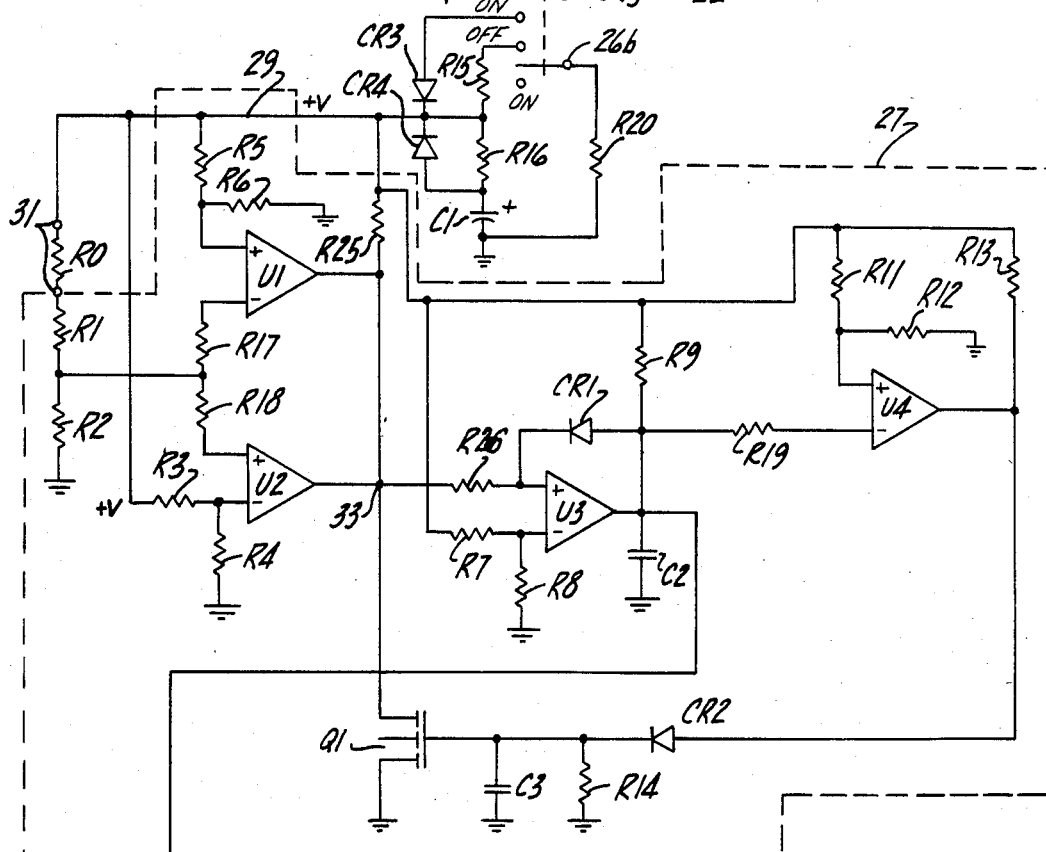

Reference is now made to FIG. 2 wherein the details of the arming switch 26 and control circuit 27 are depicted. The arming switch 26 is a double pole, double throw variety in which one pole 26a is connected with a positive voltage source, $V_s$. The switch 26 may be actuated between a deactivated or off position to an on position. With the switch 26 in the off position, the positive voltage source $V_s$ is disconnected from the control circuit 27 and the switch connected to pole 26b completes a series circuit consisting of resistors R15, R16, R20 and capacitor C1; completion of this latter circuit effectively discharges capacitor C1 to ground. With the switch 26 in the on position, the $V_s$ voltage is applied to the capacitor C1 through diode CR3 and resistor R16, thereby charging capacitor C1. Capacitor C1 functions to maintain the positive supply of voltage V+, on the control circuit 27 while the vehicle's engine is being cranked and the battery voltage may be pulled below its normal value. With the switch 26 closed, current flows through pole 26a and supply 29 to various portions of the control circuit including a coded resistive element, resistor R0, and a voltage divider formed by resistors R1 and R2. R17 and R18 function as isolating resistors.

Diode CR3 acts as a blocking diode for the time period when the supply (battery) voltage is low, so that capacitor C1 does not quickly discharge through the battery. Diode CR4 provides a shorting path around the resistor R16 during the engine cranking period when the capacitor C1 supplements the supply voltage.

Resistive element R0 is removably installed at terminals 31 in the circuit and may be incorporated, for example, in the standard ignition key such that when the key is inserted into the ignition, the resistive element R0 is inserted into the circuit at terminals 31. Assuming for the moment that resistive element R0 has been inserted and that the switch 26 is toggled to its on position, a voltage is present at the junction of resistors R17 and R18 which is in turn determined by the value of resistors R0, R1 and R2. The voltage at the junction of resistors R17 and R18 is applied to the inverting and non-inverting inputs of operational amplifiers U1 and U2. The op-amps U1 and U2 are configured as a window comparator so that the voltage on the non-inverting and inverting inputs of op-amps U1 and U2 are compared to the voltages on the other inputs thereof. The values of resistors R3, R4, R5 and R6 are chosen such that they form a preselected voltage "window". If the voltage on the inverting and non-inverting inputs respectively of op-amps U1 and U2 is within the window, the outputs of these latter-mentioned op-amps go high. Thus, in effect, the window comparator formed by op-amps U1 and U2 senses the voltage and thus the unique resistance of resistive element R0. If the sensed voltage is not within the window, the outputs of op-amps U1 and U2 at terminal 33 are low.

The outputs of the comparators U1 and U2 are each delivered through a resistor R26 to the non-inverting input of an op-amp U3, the inverting input thereof being respectively connected to $V_s$ and ground through resistors R7 and R8. Op-amp U3 is configured as a comparator to compare the voltage on its positive input with a reference value. If the voltage on the positive input of op-amp U3 is greater than that on its negative input, the normally low output of op-amp U3 goes high. The high output of op-amp U3 is fed back to its positive input through diode CR1, thereby latching-in such high output. In other words, by virtue of the feedback of the high signal, the positive input of op-amp U3 will remain higher than the voltage on its negative input. The high output signal of op-amp U3 is delivered through resistor R19 to the inverting input of an op-amp U4 which is configured as an inverter. The high output of op-amp U3 results in a voltage on the negative input of op-amp U4 which is higher than the positive input thereof. Consequently, the normally high output of op-amp U4 goes low. The output of the inverter U4 is connected through a diode CR2 to the gate of field effect transistor Q1, and is also connected to ground through capacitor C3 and resistor R14. A low output from inverter U4 results in a low signal applied to the gate of transistor Q1. Consequently, transistor Q1 is biased off.

The outputs of comparators U1 and U2 (at terminal 33) are connected to the drain-to-source path of transistor Q1. Thus, it may be appreciated that when transistor Q1 is on, the high signal present at terminal 33 flows to ground. The output of comparator U3 is connected to ground through capacitor C2 and also to the base of a transistor Q2 through resistor R10. Transistor Q1 remains off and the signal present at terminal 33 remains high as long as the output of inverter U4 is low. The high output of comparator U3 turns transistor Q2 on. The collector-to-emitter path of transistor Q2 is connected through a resistor R21 to a line connected to line 34 shown in FIG. 1, wherein voltage is derived from the battery 16 ($V_{BAT}$). Initially, when transistor Q2 is on, there is no flow of current from the collector-to-emitter path thereof until the starter switch 14 is closed to supply the $V_{BAT}$ voltage. With such voltage applied, current flows from the collector-to-emitter path of transistor Q2 and through resistor R21 and through R22 to the base of transistor Q3. Current also flows through the collector-to-emitter path of transistor Q3, thereby turning off transistor Q4. A relay coil 18 for controlling relay switch 12 is connected in parallel relationship with a capacitor C4 and diode CR5, between ground and the collector of transistor Q4. With transistor Q4 off, there is no current flow between the collector-to-emitter path thereof and relay coil 18 is disabled. Disablement of relay coil 18 allows the normally closed relay switch 12 to remain closed, thus completing the series circuit between the starter solenoid 10, battery 16 and starter switch 14, thereby allowing the operator to start the engine.

It should be noted at this point that because the relay switch 12 is normally closed and the transistor Q4 is normally off, the failure of any of the components in the control system described above which are most likely to fail, will not prohibit normal operation of the vehicle's starter system. In the worst case, failure of one of such control system components will disable the control circuit and preclude the device's anti-theft mode but as mentioned previously, such an occurrence has no adverse effect on the starter system itself. Under normal use, as previously mentioned, it is first necessary to toggle the arming switch 26 to the on position. However, it is necessary to install the resistive element R0 before the arming switch 26 is toggled to the on position since, if the switch 26 is first toggled to the on position without the resistive element R0 being installed, the window comparator formed by comparators U1 and U2 will sense an incorrect (infinite) resistance across terminals 31 and a later discussed lock-out circuit will be activated which disables the starter system for a prescribed time period. Therefore, it is necessary, prior to toggling the switch 26 to its on position, to install the resistive element R0.

After the resistive element R0 has been installed and the switch 26 has been toggled to the on position, the resistive element R0 may be removed by the operator, and the security switch 12 will remain closed, thus allowing the operator to restart the vehicle as many times as is desired. The foregoing is a result of the latching features previously described in which the high output of comparator U3 is latched in. This feature may be referred to as a valet function, allowing the vehicle's owner to remove the coded resistive element R0 while a valet attends to parking the vehicle.

When the switch 26 is toggled to its off position, capacitor C1 is discharged to ground and all voltages within the control circuit go to ground. With the switch 26 in the off position, assume for the moment that an attempt is made to start the vehicle by closing the starter switch. Under these circumstances, transistors Q2 and Q3 are off but transistor Q4 conducts because of the presence of the voltage $V_{BAT}$. Consequently, relay coil 18 is energized causing security switch 12 to open, thereby preventing current flow between the battery and starter solenoid. Assuming that the arming switch 26 is toggled to an on position and an incorrect resistance is inserted between the terminals 31 (i.e., an improperly coded resistive element, a short circuit or an open circuit), the outputs of comparators U1 and U2 at terminal 33 will be low. The low output at terminal 33 likewise results in a low output from comparator U3. Consequently, transistors Q2 and Q3 remain off. Hence, when the starter switch 14 is closed, current flows from the collector-to-emitter path of transistor Q4, thereby energizing relay coil 18 and opening the security switch 12 to prevent starting the vehicle. Additionally, the low signal output from comparator U3 disables inverter U4, i.e. the output of inverter U4 goes high, thereby charging capacitor C3 through resistor R13 and diode CR2. Capacitor C3 charges to very nearly V+. Once the voltage on capacitor C3 exceeds the turn on threshold of transistor Q1, Q1 conducts, thereby maintaining the voltage at terminal 33 low. Transistor Q1 remains on to maintain the output of comparator U3 low as long as the arming switch 26 remains closed.

If, after transistor Q1 has been turned on, the arming switch 26 is opened, the charge on capacitor C3 commences decaying. Since the leakage current into the gate terminal of transistor Q1 is negligible, the dominant decay path is through resistor R14. Thus, after switch 26 is opened, transistor Q1 will remain in the conducting state for a period of time which is a function of the values of resistor R14 and capacitor C3. After this time delay, transistor Q1 reverts to a non-conducting state following which the properly coded resistive element R0 may be inserted into terminals 31 in order to start the vehicle.

If, however, before the end of the time-out of capacitor C3, the arming switch 26 is again closed, vehicle start remains inhibited. It should be noted that the low output of comparators U1 and U2 at terminal 33 holds the output of inverter U4 low. Thus, capacitor C3 is recharged to nearly V+ to restore the full value of the time delay. Accordingly, once a false code (resistance) has been entered between terminals 31, the operator must at least wait one full time delay between any opening of the arming switch 26 and its following reclosing. Otherwise, vehicle start remains inhibited.

It should also be noted here that it is not necessary to energize the relay coil 18 to hold the security switch 12 closed against the heavy current flow of the starter solenoid 10. Hence, the dependability of the system is significantly improved where the current demand of the starter motor 22 diminishes the battery voltage to a low level. Since the relay contacts neither make nor break starter solenoid current, system life is substantially extended.

From the foregoing, it is apparent that the anti-theft device described above not only provides for the reliable accomplishment of the objects of the invention but does so in a particularly economical and effective manner. It is recognized, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. An anti-theft device for a vehicle starter ignition system, comprising:
    switch means coupled with said starter ignition system for interrupting the flow of electrical current through said starter ignition system;
    a resistive element having a resistive value unique to said device;
    means for removably mounting said resistive element on said vehicle to allow the vehicle's operator to remove said resistive element from the vehicle in order to prevent theft of said vehicle; and
    a control circuit coupled between said switch means and said resistive element for sensing the value of said resistive element when the latter is mounted on said vehicle and for controlling said switch means in accordance with the sensed value of resistance, said control circuit including a comparator circuit for comparing the sensed value of said resistive element with two reference values.

2. The anti-theft device of claim 1, wherein said switch means includes an electrically energizable relay having a normally closed switching element.

3. The anti-theft device of claim 1, including a manually operable switch coupled with said resistive element for controlling the application of electrical voltage to said resistive device.

4. A device for preventing unauthorized use of a vehicle having an electrical starter ignition system of the type including a voltage source such as a battery, an electrically energizable starter for starting the vehicle's engine and a starter switch for selectively connecting the battery with the starter, comprising:

electrically controllable switch means connected between said voltage source and said starter and having an open state for interrupting the flow of current between said battery and said starter and a closed state for allowing current flow between said battery and said starter;

a resistive element having a preselected resistive value unique to said device;

a control circuit coupled between said resistive element and said electrically controllable switch means for sensing the value of said resistive element and for controlling the operation of said electrically controllable switch means in accordance with the sensed value of said resistive element, said control circuit including a comparator circuit for comparing the voltage across said resistive element with two reference values;

manually operable switch means adapted to be coupled with a supply of voltage, with said control circuit, and with said resistive element, said manually operable switch means being switchable between an actuated state in which voltage is applied to said resistive element and said control circuit from said supply to activate said device and a deactuated state in which voltage from said supply is removed from said resistive element and said control circuit; and means for removably mounting said resistive element on said vehicle and in an electrical circuit with said manually operable switch means.

5. A device for preventing unauthorized use of a vehicle provided with an electrical starter system of the type having a series circuit including a voltage source such as a battery, an electrically energizable starter for starting the vehicle's engine and a starter switch controlled by the vehicle's operator for selectively connecting the battery with the starter, comprising:

a security switch in said series circuit, said security switch having a closed position allowing current flow through said circuit and an open position interrupting current flow through said circuit to prevent starting the vehicle's engine;

an electrically energizable control element for controlling the operation of said security switch, said control element holding said security switch in said closed position thereof when said control element is deenergized; and switch means for selectively connecting said control element with said voltage source, said switch means having an activated state in which said control element is connected with said voltage source to energize said control element and thereby operate said security switch to said open position thereof, and having a deactivated state in which said control element is disconnected from said voltage source to deenergize said control element and thereby operate said security switch to said closed position thereof, said switch means including a transistor having a collector-to-emitter path coupled with said voltage source.

6. The device of claim 5, wherein said security switch and said control element define an electrical relay.

7. The device of claim 5, including control means for controlling the operation of said switch means, said control means including:

a resistive element having a preselected resistive value unique to said vehicle, means for removably mounting said resistive element on said vehicle, and means for sensing the value of said resistive element and for operating said switch means to said deactivated state thereof when the preselected voltage value is sensed.

8. The device of claim 5, wherein said switch means includes a normally closed relay.

9. Apparatus for preventing unauthorized use of an electrical device of the type having a direct current power source, comprising:

a first security switch connected in a series circuit which includes said power source and said device;

a resistive element having a preselected resistive value which is unique to said device;

means for removably mounting said resistive element on said device, removal of said resistive element preventing unauthorized use of said device;

a second manually actuatable switch for actuating said apparatus, said second switch including an actuated state and a deactuated state; and a control circuit interconnecting said resistive element and said second switch with said first switch and controlling the operation of said first switch, said control circuit including (1) sensing means for sensing the value of said resistive element and for outputting a first control signal when the sensed resistive value is within a preselected range, (2) first control means for normally holding said first switch in a closed position allowing current flow between said power source and said device to permit authorized use of said device, and (3) second control means responsive to said first control signal for controlling the operation of said first control means.

10. The apparatus of claim 9, wherein said sensing means includes a pair of comparator means for respectively comparing the voltage across said resistive element with first and second reference values.

11. The apparatus of claim 9, wherein said second control means includes means for latching in said first control signal to control said first control means to hold said switch in said closed position thereof when said second switch is in said actuated state thereof and said resistive element has been removed from said device.

12. The apparatus of claim 11, wherein said latching means includes a capacitor.

13. The apparatus of claim 10, wherein said second control means includes:

a first comparator having an input connected to receive said first control signal, and having an input for delivering a second control signal to said first control means, a second comparator having an input connected to said output of said first comparator and having an output, and means for temporarily storing electrical energy to provide a source of voltage to be applied to said input of said first comparator, said storing means being connected between the output of said second comparator and said input of said first comparator.

14. The apparatus of claim 9, wherein said first control means includes at least one transistor and a relay coil responsive to said transistor and controlling said first switch.

15. The apparatus of claim 14, wherein said transistor is normally off and said first switch is normally closed.

16. An anti-theft device for a vehicle starter ignition system, comprising:
- switch means coupled with said starter ignition system for interrupting the flow of electrical current through said starter ignition system, said switch means including an electrically energizable relay having a normally closed switching element and an electrically energizable coil for controlling said switching element;
- a resistive element having a resistive value unique to said device;
- means for removably mounting said resistive element on said vehicle to allow the vehicle's operator to remove said resistive element from the vehicle in order to prevent theft of said vehicle; and
- a control circuit coupled between said switch means and said resistive element for sensing the value of said resistive element when the latter is mounted on said vehicle and for controlling said switch means in accordance with the sensed value of resistance, said control circuit including an electrical switch for controlling the flow of current to said coil.

17. An anti-theft device for a vehicle starter ignition system, comprising:
- switch means coupled with said starter ignition system for interrupting the flow of electrical current through said starter ignition system;
- a resistive element having a resistive value unique to said device;
- means for removably mounting said resistive element on said vehicle to allow the vehicle's operator to remove said resistive element from the vehicle in order to prevent theft of said vehicle;
- a control circuit coupled between said switch means and said resistive element for sensing the value of said resistive element when the latter is mounted on said vehicle and for controlling said switch means in accordance with the sensed value of resistance, said control circuit including means for sensing the voltage across said resistive element and for producing a control signal when the sensed voltage is within a preselected range, said switch means being controlled by said control signal; and,
- a manually operable switch coupled with said resistive element for controlling the application of electrical voltage to said resistive device.

18. The anti-theft device of claim 17, wherein said control circuit includes means for latching in said control signal so that said control signal continues to control said switch means after said resistive element has been removed from said vehicle.

19. A device for preventing unauthorized use of a vehicle having an electrical starter ignition system of the type including a voltage source such as a battery, an electrically energizable starter for starting the vehicle's engine and a starter switch for selectively connecting the battery with the starter, comprising:
- electrically controllable switch means connected between said voltage source and said starter and having an open state for interrupting the flow of current between said battery and said starter and a closed state for allowing current flow between said battery and said starter;
- a resistive element having a preselected resistive value unique to said device;
- a control circuit coupled between said resistive element and said electrically controllable switch means for sensing the value of said resistive element and for controlling the operation of said electrically controllable switch means in accordance with the sensed value of said resistive element, said control circuit including means for preventing closure of said electrically controllable switch means for a predetermined length of time following the sensing of a resistive value by said control circuit other than said preselected value when said manually operable switch means is in said actuated state thereof;
- manually operable switch means adapted to be coupled with a supply of voltage, with said control circuit, and with said resistive element, said manually operable switch means being switchable between an actuated state in which voltage is applied to said resistive element and said control circuit from said supply to activate said device and a deactuated state in which voltage from said supply is removed from said resistive element and said control circuit; and
- means for removably mounting said resistive element on said vehicle and in an electrical circuit with said manually operable switch means.

20. The device of claim 19, wherein said means for preventing closure of said electrically controllable switch means includes a capacitor.

21. A device for preventing unauthorized use of a vehicle having an electrical starter ignition system of the type including a voltage source such as a battery, an electrically energizable starter for starting the vehicle's engine and a starter switch for selectively connecting the battery with the starter, comprising:
- electrically controllable switch means connected between said voltage source and said starter and having an open state for interruptng the flow of current between said battery and said starter and a closed state for allowing current flow between said battery and said starter, said switch means including relay means having normally closed switch contacts and a coil for controlling said switch contacts;
- a resistive element having a preselected resistive value unique to said device;
- a control circuit coupled between said resistive element and said electrically controllable switch means for sensing the value of said resistive element and for controlling the operation of said electrically controllable switch means in accordance with the sensed value of said resistive element, said control circuit including an electrical switching device coupled in a circuit with said starter switch and said voltage source for controlling the energization of said coil;
- manually operable switch means adapted to be coupled with a supply of voltage, with said control circuit, and with said resistive element, said manually operable switch means being switchable between an actuated state in which voltage is applied to said resistive element and said control circuit from said supply to activate said deivce and a deactuated state in which voltage from said supply is removed from said resistive element and said control circuit; and
- means for removably mounting said resistive element on said vehicle and in an electrical circuit with said manually operable switch means.

* * * * *